Aug. 8, 1944.  L. NUSBAUM  2,355,550
APPARATUS FOR PRODUCING AIR COLLOIDS
Filed Aug. 5, 1943
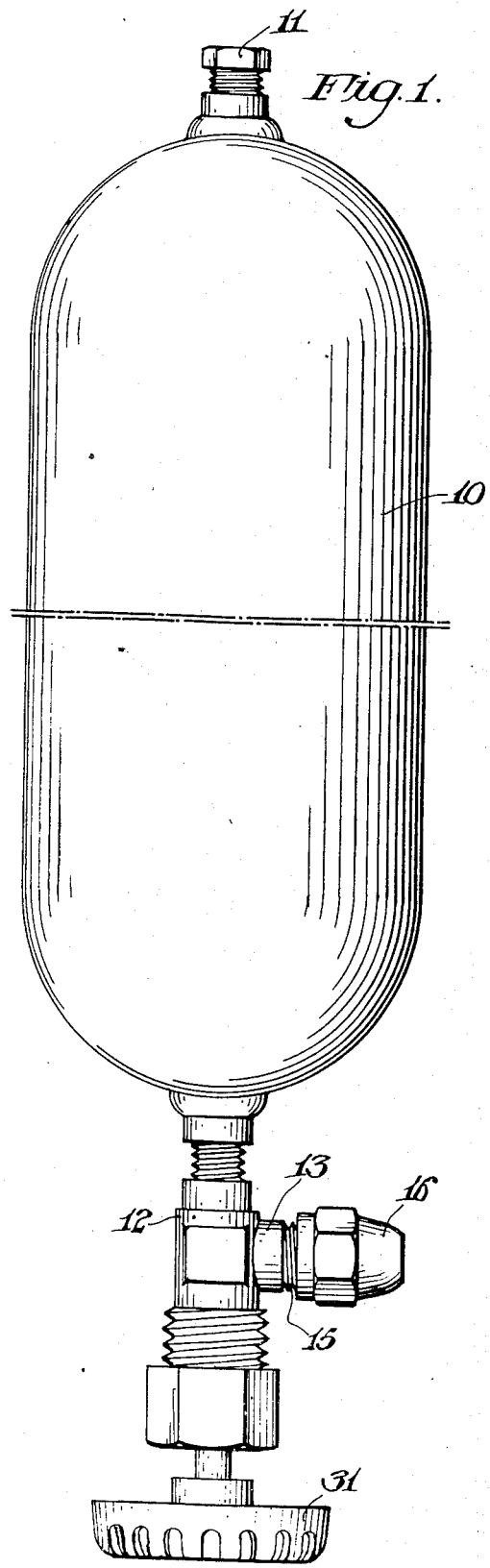
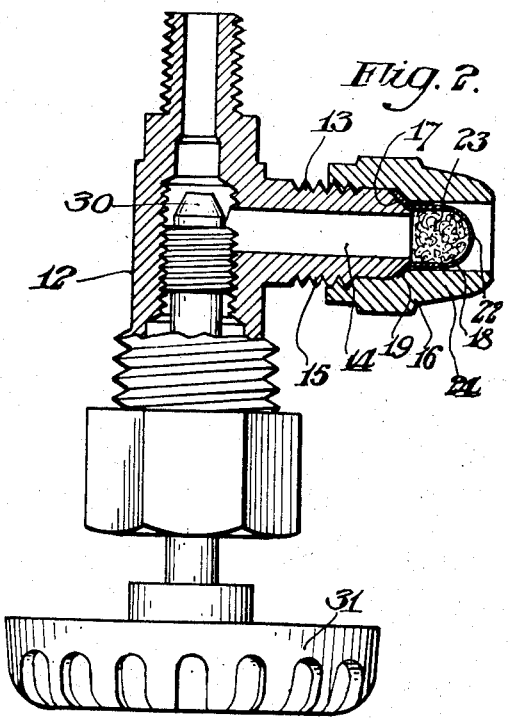
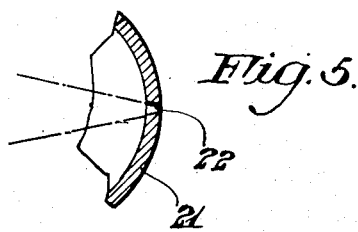
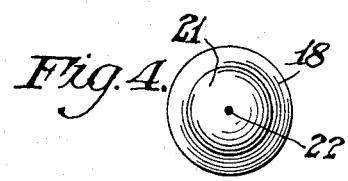
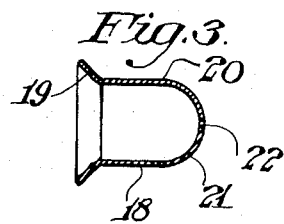
Inventor:
Lee Nusbaum,
By Jas. C. Wobensmith
Attorney Patented Aug. 8, 1944

2,355,550

UNITED STATES PATENT OFFICE 2,355,550

APPARATUS FOR PRODUCING AIR COLLOIDS

Lee Nusbaum, Philadelphia, Pa.

Application August 5, 1943, Serial No. 497,469

3 Claims. (Cl. 299—95)

This invention relates to apparatus for producing air colloids, and is particularly applicable in connection with the effective distribution or dispersion of insecticides, fumigants and the like in air.

Various materials solid or liquid, incorporated in a carrier or disseminating agent or propellant, have heretofore been employed as insecticides and the like. The distribution of these materials in an effective manner for utilization in a confined space such as a room, or in a selected location out of doors has presented numerous difficulties. It has been particularly difficult to provide for the distribution of the active material in effective small particle sizes and to retain the distributed material in air suspension for adequate time periods. Apart from these considerations the apparatus heretofore available has not been wholly satisfactory for the production of air colloids because of the tendency to eject a liquid rather than a gaseous stream, a phenomena referred to as streaming. The apparatus heretofore available has also been unsatisfactory because of its failure to operate without streaming if an insecticide material or the like in solid, rather than liquid, form is incorporated in the disseminating agent.

In the distribution or dissemination of materials for insecticidal purposes pyrethrins have been employed in various ways. The use of pyrethrins for their insecticidal properties has heretofore been undertaken in various ways. For example, pyrethrins have heretofore been incorporated in kerosene as a carrier or propellant. The settling takes place in from three to three and a half minutes after spraying so that a continuously effective action is not obtained.

It is the principal object of the present invention to provide a dispenser for the production of air colloids which will be relatively inexpensive to manufacture but which will function more effectively than apparatus heretofore available.

It is a further object of the present invention to provide apparatus for the production of air colloids from solids dissolved in a liquefied propellant.

Other objects of the invention wil be apparent from the annexed specification and claims.

The nature and characteristic features of the invention will be more readily understood from the following description, taken in connection with the accompanying drawing forming part hereof, in which:

Figure 1 is a side elevation of a container having attached thereto a dispenser embodying the main features of the present invention;

Fig. 2 is an enlarged view, partly in vertical central section of the dispenser, detached from the container;

Fig. 3 is a vertical central sectional view of the discharge controlling element, detached from the nipple on which it is normally mounted;

Fig. 4 is a front elevation of the discharge controlling element; and

Fig. 5 is fragmentary vertical sectional view, still further enlarged of a portion of the discharge controlling element.

It will, of course, be understood that the description and drawing herein are illustrative merely, and that various modifications and changes may be made in the structure disclosed without departing from the spirit of the invention.

In accordance with the present invention provision is made for the distribution of insecticidal or like materials in the form of air colloids in which the particles remain in suspension and do not settle out of the air for at least twenty or twenty-five minutes. Such air colloids are incapable of attainment with propellants such as kerosene. For the production of an air colloid as herein set forth it is preferable to use some carrier or propellant which is a gas at ordinary pressures and temperatures but which is capable of being compressed and liquefied for shipping and storage in liquid state. It is also frequently desired to add a synergist for amplifying or increasing the effectiveness of the insecticidal material. One suitable carrier or propellant is dichlorodifluoromethane which expands approximately 240 times its liquid volume upon release and change of state from liquid to gas form. Another suitable propellant material is methyl chloride.

Merely by way of illustration one specific insecticidal material for which the apparatus of the present invention is particularly adapted is as follows:

| | Per cent |
|---|---|
| Solution of pyrethrins I and II (20%) | 5 |
| Sesame oil (filtered) | 2 |
| Dichlorodifluoromethane | 93 |

The release of such carrier or propellant and conversion to gas form, particularly with suitable insecticidal materials and synergists carried therein, has heretofore been troublesome and particularly susceptible to streaming.

Referring to the drawing, in which a dispenser for delivering materials in air colloid form is illustrated, a suitable container 10, such as a steel bottle or the like, is provided for holding a suitable quantity, in liquid form, and under high pressure, of the material to be discharged into the atmosphere and gasified for insecticidal, fumigant or like purposes.

The container 10 preferably has mounted, at the upper end thereof, a fusible plug 11 for release if the contents attain an excessive temperature or pressure.

The container 10 preferably has mounted, at the lower end thereof and for direct delivery of the liquid thereto, a valve housing 12 with a sidewise extending nipple 13 provided with an internal port 14, and external threads 15 for mounting a gland 16 thereon. The outer end of the nipple 13 is preferably chamfered as at 17 for mounting thereon a discharge element 18. The discharge controlling element 18 has a flaring flange portion 19 for engagement which is adapted to be gripped by the gland 16 when the same is threaded on the nipple 13.

The discharge controlling element 18 is preferably made of thin sheet material, such as copper and has a central portion 20 substantially cylindrical in shape and an end portion 21 preferably semi-spherical in shape. The end portion 21 is provided with a central aperture or discharge opening 22, relatively small in size and of particular configuration, as hereinafter more fully pointed out, for the discharge of the material in the container 10 to the atmosphere.

The interior space of the discharge element 18, may if desired, be filled with cotton 23, or other fibrous material, which is thus, by reason of its location, maintained in saturated condition thereby aiding in the discharge of propellants having solids dissolved therein and preventing the building up of solids in the fibrous filling 23 or on the outside of the end 21 at and around the opening 22. If desired some other solvent of the dissolved solid may also be used as a saturant. The fibrous filling 23 also constitutes a filter for preventing access of undissolved solid impurities to the discharge opening 22. The tightness of packing of the filling 23 may also be used for controlling, to a limited extent, the rate of discharge through the opening 22.

The outer end 24 of the gland 16 is of sleeve like form and preferably extends for some distance beyond the end 21 of the discharge element 18, thereby serving to protect the same against deformation and injury.

The valve housing 12 is preferably provided with a suitable discharge control valve 30 and an external handle 31 is provided for actuation of the valve. The control valve 30 is preferably moved, as desired, either to on or off position, with the rate of discharge controlled by the opening 22. If desired, the valve 30 may also be used for controlling the rate of discharge through the opening 22.

As heretofore pointed out the central aperture or discharge opening 22 is of peculiar conformation and preferably consists of a tapered or frusto-conical opening with the smaller diameter at or adjacent the curved outer surface of the end portion 21 and with the larger diameter at the curved inner surface of the end portion 21. No attempt is made in the formation of the opening to provide a surface of mirror brightness. Slight irregularities in the metal, particularly at the outer terminus of the opening 22 are readily observable with a magnification of the order of two to three hundred times and apparently aid in the desired gassing action. The size of the opening 22 may be varied in accordance with the rate of discharge desired. With an initial internal pressure of approximately 75 or 80 pounds per square inch and for a discharge rate of from one half to about two ounces per minute the smaller diameter of the opening 22 is of the order of .008 of an inch. It has been observed that very slight changes in this dimension may be utilized for fixing the discharge rate to closer limits, for example to fix the desired rate to quarter or half pound fractional parts in the range mentioned.

The internal angle of the cone or between opposite side wall portions of the opening 22 may be varied but has been found to be very effective in the range from about 15 to 20 degrees. The exact phenomena occurring at the opening is not entirely understood but the character of opening described above has been found in practice to be very satisfactory.

Various other types of discharge openings do not seem to be satisfactory for the production of air colloids. For example straight cylindrical openings of various sizes were tried, in which the interiors of the openings were of mirror brightness. They would provide a gaseous flow for a moment and would then stream. Capillary tubes having considerable internal surface friction were also tried and while these were fairly satisfactory if liquid insecticides were dissolved in the liquefied carrier they would not function satisfactorily if insecticides in solid form were dissolved in the liquefied carrier. Discharge openings comprising conical openings expanding towards the discharge side in the range from .005 to .010 of an inch diameter at the smallest and inner end and with cone angles up to 60 degrees were also tried but these would produce gas for a moment and then a stream of liquid.

With the discharge orifice 22 in accordance with the present invention the liquid stream is not visible beyond about two or three inches from the end 21 and a continuous regulated discharge of gasified propellant and the ingredients, including soluble solids, carried therein is obtained. The desired dissemination of insecticidal material in air colloid form is thus readily achieved.

I claim:

1. In apparatus for producing air colloids, a liquid container for retaining under pressure the propellant and the material to be distributed in colloidal form, a discharge control member connected to the lower end of said container, said discharge control member including a thin cap having a discharge orifice of frusto-conical shape decreasing in diameter towards the discharge end thereof, the interior of said cap being exposed to the full pressure of the liquid in the interior of the container and the exterior of said cap being exposed to the atmosphere.

2. In apparatus for producing air colloids, a liquid container for storing under pressure the propellant and the material to be distributed in air colloid form, discharge control means connected to the lower end of said container, said discharge control means including a thin curved end closure having a discharge orifice of frusto-conical shape decreasing in diameter towards the discharge end thereof, the interior of said end closure member being exposed to the full pressure of the liquid in the interior of the container and the exterior of said end closure member being exposed to the atmosphere.

3. In apparatus for producing air colloids, a liquid container for storing under pressure the propellant and the material to be distributed in colloidal form, a valve member connected to the lower end of said container, a discharge control member connected to said valve, said discharge control member including an end closure provided with a thin curved cap having a centrally disposed discharge orifice of frusto-conical shape decreasing in diameter towards the discharge end thereof, the interior of said cap being exposed to the full pressure of the liquid in the interior of the container and the exterior of said cap being exposed to the atmosphere.

LEE NUSBAUM.